(12) United States Patent
Nomi

(10) Patent No.: US 8,194,537 B2
(45) Date of Patent: Jun. 5, 2012

(54) TERMINAL AFFILIATION SWITCHOVER SYSTEM

(75) Inventor: Motohide Nomi, Kawasaki (JP)

(73) Assignee: ALAXALA Networks Corporation, Kanagawa (JP)

( * ) Notice: Subject to any disclaimer, the term of this patent is extended or adjusted under 35 U.S.C. 154(b) by 653 days.

(21) Appl. No.: 11/833,749

(22) Filed: Aug. 3, 2007

(65) Prior Publication Data

US 2008/0186977 A1 Aug. 7, 2008

(30) Foreign Application Priority Data

Feb. 1, 2007 (JP) .................................. 2007-23124

(51) Int. Cl.
| | |
|---|---|
| *G01R 31/08* | (2006.01) |
| *G06F 11/00* | (2006.01) |
| *G06F 15/16* | (2006.01) |
| *G06F 15/173* | (2006.01) |
| *G06F 17/30* | (2006.01) |
| *G06F 17/00* | (2006.01) |
| *G06F 12/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |
| *H04L 12/56* | (2006.01) |
| *G08B 23/00* | (2006.01) |
| *H04N 7/16* | (2011.01) |
| *G06F 12/14* | (2006.01) |
| *G06F 12/16* | (2006.01) |
| *G06F 13/00* | (2006.01) |

(52) U.S. Cl. ... 370/219; 370/227; 370/245; 370/395.32; 370/402; 709/209; 709/242; 726/7; 726/15; 726/19; 726/20; 726/24; 726/25; 726/28; 726/29; 726/30

(58) Field of Classification Search ........................ None
See application file for complete search history.

(56) References Cited

U.S. PATENT DOCUMENTS

| | | | | |
|---|---|---|---|---|
| 2006/0047835 | A1* | 3/2006 | Greaux | 709/229 |
| 2006/0212549 | A1* | 9/2006 | Hokkyo et al. | 709/220 |
| 2007/0002833 | A1* | 1/2007 | Bajic | 370/352 |
| 2007/0121617 | A1* | 5/2007 | Kanekar et al. | 370/389 |
| 2008/0127294 | A1* | 5/2008 | Keith | 726/1 |

FOREIGN PATENT DOCUMENTS

JP 2006-033206 2/2006

* cited by examiner

*Primary Examiner* — Nishant B Divecha

(74) *Attorney, Agent, or Firm* — Brundidge & Stanger, P.C.

(57) ABSTRACT

In the terminal affiliation switchover system of the invention, in the case of allocation of an IP address to one terminal in a VPN#1 in response to an IP address allocation request, a DHCP server module 121 changes registry information in a DHCP table 122 provided for the VPN#1 and simultaneously makes the change of the registry information reflected in registry of a DHCP table 222 provided for a VPN#2 via a DHCP server module 221. Similarly in the case of allocation of an IP address to one terminal in the VPN#2 in response to an IP address allocation request, the DHCP server module 221 changes the registry information in the DHCP table 222 for the VPN#2 and simultaneously makes the change of the registry information reflected in the registry of the DHCP table 122 for the VPN#1 via the DHCP server module 121.

8 Claims, 11 Drawing Sheets

Fig.2(a)  VPN#1

112

| Entry | VLAN | IP Address | Subnet Mask |
|---|---|---|---|
| T1R1 | 100 | 10.0.0.1 | 255.255.255.0 |
| T1R2 | 110 | 11.0.0.1 | 255.255.255.0 |
| T1R3 | 120 | 12.0.0.1 | 255.255.255.0 |

Fig.2(b)  VPN#2

212

| Entry | VLAN | IP Address | Subnet Mask |
|---|---|---|---|
| T2R1 | 200 | 10.0.0.1 | 255.255.255.0 |
| T2R2 | 210 | 11.0.0.1 | 255.255.255.0 |
| T2R3 | 220 | 12.0.0.1 | 255.255.255.0 |

Fig.3(a)  VPN#1

222

| Entry | IP Address | MAC Address | Use Status |
|---|---|---|---|
| T1D1 | 10.0.0.2 | XXXX:XXX:0001 | In Use |
| T1D2 | 10.0.0.3 | — | Unused |
| T1D3 | 10.0.0.4 | XXXX:XXX:0002 | In Use |
| ⋮ | ⋮ | ⋮ | ⋮ |

Fig.3(b)  VPN#2

122

| Entry | IP Address | MAC Address | Use Status |
|---|---|---|---|
| T2D1 | 10.0.0.2 | XXXX:XXX:0001 | In Use |
| T2D2 | 10.0.0.3 | — | Unused |
| T2D3 | 10.0.0.4 | XXXX:XXX:0002 | In Use |
| ⋮ | ⋮ | ⋮ | ⋮ |

TERMINAL AFFILIATION SWITCHOVER SYSTEM

BACKGROUND OF THE INVENTION

1. Field of the Invention

The present invention relates to a technique of switching over affiliation of a terminal at least between a first network and a second network.

2. Description of the Related Art

In an authentication quarantine network system, the network independence is essential to prohibit communication between a quarantine network and a business network. Similarly in an authentication network system, the network independence is essential to prohibit communication between a pre-authentication network and a post-authentication network. In order to ensure the network independence, a packet relay device allocates different VLANs or virtual local area networks to the respective networks. Allocation of the different VLANs logically separates the communication.

FIG. 10 is a block diagram schematically illustrating the configuration of a prior art terminal affiliation switchover system applied in an authentication quarantine network system. In the authentication quarantine network system shown in FIG. 10, a packet relay device RS10 first affiliates a terminal PC10, which does not satisfy the security policy of the network, with a VLAN 100 corresponding to a quarantine network NW1. An authentication server SV1 and a quarantine server SV2 connecting with the quarantine network NW1 then authenticate and quarantine the terminal PC10. When the terminal PC10 is quarantined to satisfy the security policy and is authenticated, the packet relay device RS10 affiliates the terminal PC10 with a VLAN 200 corresponding to a business network NW2.

A DHCP server module 1121 included in the packet relay device RS10 allocates an IP address to the terminal PC10 and enables the terminal PC10 to make an access and establish communication. In the conventional system, each packet may be relayed on the layer 3 routing between different VLANs. The DHCP server module 1121 in the packet relay device RS10 is thus required to allocate a different IP address to the same terminal PC10 in response to a switchover of the affiliated VLAN of the terminal PC10. In the layer 3 routing, unless different subnet IP addresses are allocated to the respective VLANs, the packet relay device can not identify a target VLAN as a receiver of a relayed packet. In the event of a switchover of affiliation of the terminal PC10 from the VLAN 100 corresponding to the quarantine network NW1 to the VLAN 200 corresponding to the business network NW2, the DHCP server module 1121 allocates a different IP address to the terminal PC10 under the condition of affiliation with the VLAN 200 of the business network NW2 from a previous IP address allocated to the same terminal PC10 under the condition of affiliation with the VLAN 100 of the quarantine network NW1.

In the authentication quarantine network system of FIG. 10, the packet relay device RS10 has a VLAN 100 processor 1401 for management of the VLAN 100, a VLAN 200 processor 1501 for management of the VLAN 200, an authentication daemon 1301 for switchover of affiliation of the terminal PC10 between the VLAN 100 and the VLAN 200, and a routing module 1111 for management of routing, in addition to the DHCP server module 1121. The DHCP server module 1121 has a DHCP table 1122, and the routing module 1111 has a routing table 1112. The business network NW2 is connected with a business server SV3.

FIG. 11 is a block diagram schematically illustrating the configuration of a prior art terminal affiliation switchover system applied in an authentication network system. In the authentication network system shown in FIG. 11, a packet relay device RS20 first affiliates a terminal PC10 prior to authentication with a VLAN 100 corresponding to a pre-authentication network NW3. An authentication server SV1 connecting with the packet relay device RS20 then authenticates the terminal PC10. On completion of authentication, the packet relay device RS20 affiliates the terminal PC10 with a VLAN 200 corresponding to a business network NW2 as a post-authentication network.

A DHCP server module 1121 included in the packet relay device RS20 allocates an IP address to the terminal PC10 and enables the terminal PC10 to make an access and establish communication. As in the conventional authentication quarantine network system of FIG. 10, in this authentication network system of FIG. 11, in the event of a switchover of affiliation of the terminal PC10 from the VLAN 100 corresponding to the pre-authentication network NW3 to the VLAN 200 corresponding to the business network NW2 as the post-authentication network, the DHCP server module 1121 allocates a different IP address to the terminal PC10 under the condition of affiliation with the VLAN 200 of the business network NW2 as the post-authentication network from a previous IP address allocated to the same terminal PC10 under the condition of affiliation with the VLAN 100 of the pre-authentication network NW3.

The like constituents in the authentication network system of FIG. 11 to those in the quarantine authentication network system of FIG. 10 are expressed by the like numerals and symbols and are not specifically mentioned here. The pre-authentication network NW3 is constructed to include only a VLAN 100 processor 1401 of the packet relay device RS20.

One known example of the authentication network system is disclosed in Japanese Patent Laid-Open Gazette No. 2006-33206.

As described above, in the conventional quarantine authentication network system and the conventional authentication network system, the DHCP server module 1121 is required to allocate a different IP address to the same terminal PC10 in response to every switchover of the affiliated VLAN of the terminal PC10. The DHCP server module 1121 allocates an IP address to the terminal PC10, in response to an IP address allocation request sent from the terminal PC10 to the DHCP server module 1121. The terminal PC 10, however, sends the IP address allocation request to the DHCP server module 1121 only after elapse of a preset lease time in the event of a switchover of the affiliated VLAN. Namely the terminal PC10 holds the previous IP address until elapse of the preset lease time, even when the affiliation is switched over to the VLAN 200 corresponding to the business network NW2 (post-authentication network). This undesirably interrupts the communication of the terminal PC10.

SUMMARY OF THE INVENTION

With a view to solving the problem of the prior art, the present invention provides a technique of enabling a terminal to continue communication even in the event of a change of an affiliated VLAN of the terminal.

According to one aspect, the present invention is directed to a first terminal affiliation switchover system that switches over affiliation of a terminal at least between a first network and a second network. The first terminal affiliation switchover system includes: a terminal affiliation switchover module that switches over an affiliated network of the terminal between the first network and the second network; a first DHCP or dynamic host configuration protocol server that, when the terminal belongs to the first network, allocates an IP address to the terminal based on registry information in a first DHCP table; and a second DHCP server module that, when the terminal belongs to the second network, allocates the IP address to the terminal based on registry information in a second DHCP table. At every time of any change of the registry information in one of the first DHCP table and the second DHCP table, the first DHCP server module and the second DHCP server module make the change of the registry information reflected in the registry information in the other of the first DHCP table and the second DHCP table, so that the first DHCP table and the second DHCP table have at least identical mapping information representing a correlation of the terminal to the IP address.

In the first terminal affiliation switchover system of the invention, at every time of any change of the registry information in one of the first DHCP table and the second DHCP table, the first DHCP server module and the second DHCP server module make the change of the registry information reflected in the registry information in the other of the first DHCP table and the second DHCP table. This arrangement enables the first DHCP table and the second DHCP table to have at least identical mapping information representing a correlation of the terminal to the IP address.

In the first terminal affiliation switchover system of the invention, the registry information in the first DHCP table is continuously synchronized with the registry information in the second DHCP table. The first terminal affiliation switchover system of this arrangement enables the terminal to continue communication without changing the IP address even in the case of a change of the affiliated network of the terminal.

In one preferable structure of the first terminal affiliation switchover system of the invention, the terminal affiliation switchover module, the first DHCP server module, and the second DHCP server module are incorporated in one identical device.

In another preferable structure of the first terminal affiliation switchover system of the invention, the first DHCP server module and the second DHCP server module are incorporated in one identical device, and the terminal affiliation switchover module is provided separately in a different device other than the identical device.

In still another preferable structure of the first terminal affiliation switchover system of the invention, the first DHCP server module and the second DHCP server module are provided separately in different devices.

The first terminal affiliation switchover system of the invention has the advantage described above, whether the terminal affiliation switchover module, the first DHCP server module, and the second DHCP server module are located in an identical device or in different separate devices.

In the first terminal affiliation switchover system of the invention, it is preferable that the first DHCP server module and the second DHCP server module are incorporated in one identical packet relay device. This arrangement ensures efficient management of the IP address by the packet relay device alone.

In one preferable embodiment of the first terminal affiliation switchover system of the invention, the first network and the second network are independent VPNs or virtual private networks that are not mutually communicable and separately and independently perform routing and forwarding operations. Each of the first network and the second network of this arrangement can independently establish communication without being affected by the other.

According to another aspect, the present invention is directed to a second terminal affiliation switchover system that switches over affiliation of a terminal at least between a first network and a second network. The second terminal affiliation switchover system includes: a terminal affiliation switchover module that switches over an affiliated network of the terminal between the first network and the second network; and a DHCP server module that, when the terminal belongs to the first network, allocates an IP address to the terminal based on registry information in a first DHCP table, and when the terminal belongs to the second network, allocates the IP address to the terminal based on registry information in a second DHCP table. At every time of any change of the registry information in one of the first DHCP table and the second DHCP table, the DHCP server module makes the change of the registry information reflected in the registry information in the other of the first DHCP table and the second DHCP table, so that the first DHCP table and the second DHCP table have at least identical mapping information representing a correlation of the terminal to the IP address.

In the second terminal affiliation switchover system of the invention, the DHCP server module takes charge of management in both the first DHCP table and the second DHCP table. The second terminal affiliation switchover system of this arrangement also enables the terminal to continue communication without changing the IP address even in the case of a change of the affiliated network of the terminal.

According to still another aspect, the present invention is directed to a third terminal affiliation switchover system that switches over affiliation of a terminal at least between a first network and a second network. The third terminal affiliation switchover system is equipped with multiple packet relay devices based on VRRP or virtual router redundancy protocol. The multiple packet relay devices include a first packet relay device set as a master and a second packet relay device set as a backup.

The first packet relay device as the master has: a first terminal affiliation switchover module that switches over an affiliated network of the terminal between the first network and the second network; a first DHCP server module that, when the terminal belongs to the first network, allocates an IP address to the terminal based on registry information in a first DHCP table; and a second DHCP server module that, when the terminal belongs to the second network, allocates the IP address to the terminal based on registry information in a second DHCP table. The second packet relay device as the backup has: a second terminal affiliation switchover module that, when the second packet relay device is appointed as a new master, switches over the affiliated network of the terminal between the first network and the second network; a third DHCP server module that, when the second packet relay device is appointed as the new master and the terminal belongs to the first network, allocates the IP address to the terminal based on registry information in a third DHCP table; and a fourth DHCP server module that, when the second packet relay device is appointed as the new master and the terminal belongs to the second network, allocates the IP address to the terminal based on registry information in a fourth DHCP table.

At every time of any change of the registry information in one of the first DHCP table and the second DHCP table, the first DHCP server module and the second DHCP server module in the first packet relay device as the master make the change of the registry information reflected in the registry information in the other of the first DHCP table and the second DHCP table and in the registry information in both the third DHCP table and the fourth DHCP table in the second packet relay device as the backup. The first DHCP table and the second DHCP table in the first packet relay device and the third DHCP table and the fourth DHCP table in the second packet relay device accordingly have at least identical mapping information representing a correlation of the terminal to the IP address.

In the third terminal affiliation switchover system of the invention, at every time of any change of the registry information in one of the first DHCP table and the second DHCP table, the first DHCP server module and the second DHCP server module in the first packet relay device as the master make the change of the registry information reflected in the registry information in the other of the first DHCP table and the second DHCP table and in the registry information in both the third DHCP table and the fourth DHCP table in the second packet relay device as the backup. This arrangement enables the first DHCP table and the second DHCP table in the first packet relay device and the third DHCP table and the fourth DHCP table in the second packet relay device to have at least identical mapping information representing a correlation of the terminal to the IP address.

In the third terminal affiliation switchover system of the invention, the registry information in the first DHCP table in the first packet relay device as the master is continuously synchronized with the registry information in the second DHCP table in the first packet relay device, as well as with the registry information in both the third DHCP table and the fourth DHCP table in the second packet relay device as the backup. Even when the second packet relay device is appointed as a new master and takes over communication in the event of some failure or trouble in the first packet relay device as the master, the terminal can continue the communication without changing the IP address regardless of a switchover of the affiliated network of the terminal.

The technique of the present invention is not restricted to the terminal affiliation switchover system described above, but is also actualized by diversity of other applications, for example, a packet relay device, a DHCP server as well as corresponding methods including a terminal affiliation switchover method.

BRIEF DESCRIPTION OF THE DRAWINGS

FIGS. 2*a*-2*b* show examples of registries in rooting tables provided for respective VPNs included in the terminal affiliation switchover system of FIG. 1;

FIGS. 3*a*-3*b* show examples of registries in DHCP tables provided for the respective VPNs included in the terminal affiliation switchover system of FIG. 1;

DESCRIPTION OF THE PREFERRED EMBODIMENTS

A. First Embodiment

Figure 1:
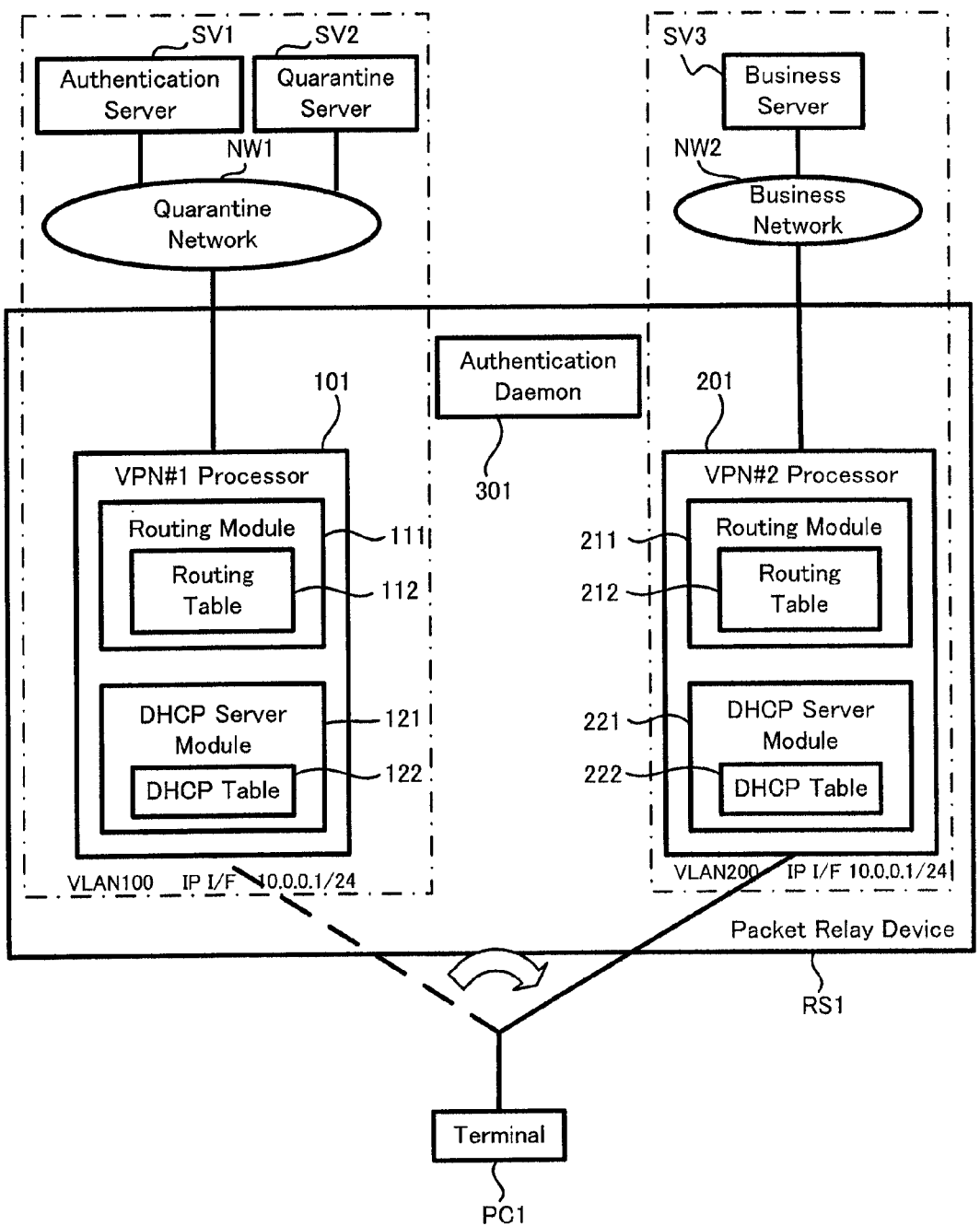
FIG. 1 is a block diagram schematically illustrating the configuration of a terminal affiliation switchover system in a first embodiment of the invention.

FIG. 1 is a block diagram schematically illustrating the configuration of a terminal affiliation switchover system in a first embodiment of the invention. The terminal affiliation switchover system of the first embodiment is adopted in an authentication quarantine network system.

As shown in FIG. 1, the terminal affiliation switchover system of the embodiment includes a packet relay device RS1 to relay packets in the authentication quarantine network system, a terminal PC1 connected to the packet relay device RS1 via the network, and a quarantine network NW1 and a business network NW2 as network constituents of the authentication quarantine network system.

The quarantine network NW1 is connected with an authentication server SV1 and a quarantine server SV2, whereas the business network NW2 is connected with a business server SV3. The quarantine network NW1 is used to isolate any terminal that does not satisfy the security policy of the network. The business network NW2 is used to authenticate the access to the network and allow a terminal satisfying the security policy of the network to make access to the business server SV3 for operation. The quarantine network NW1 and the business network NW2 are thus constructed as separate networks that can not establish mutual communication. More specifically, the quarantine network NW1 and the business network NW2 respectively have a VLAN 100 and another VLAN 200 assigned thereto by the packet relay device RS1 to logically separate their communication.

The authentication server SV1 has an authentication database (not shown) for determining permission or rejection of the access from the terminal PC1 to the network. The authentication database has registry of authentication information regarding, for example, the user name and the password. In response to a request for authentication with input of the authentication information including the user name and the password from the terminal PC1, the authentication server SV1 identifies whether the input authentication information matches with information registered in the authentication database.

The quarantine server SV2 identifies whether the terminal PC1 authenticated for the access to the network satisfies the security policy of the network. The quarantine server SV2 provides the terminal PC1 that does not satisfy but violates the security policy with a cure to attain satisfaction of the security policy.

When the terminal PC1 requiring the access to the network violates the security policy, the packet relay device RS1 allows the connection of the terminal PC1 to only the VLAN 100 of the quarantine network NW1. When the terminal PC1 satisfies the security policy, on the other hand, the packet relay device RS1 allows the connection of the terminal PC1 to only the VLAN 200 of the business network NW2.

In the system of this embodiment, by the function of the packet relay device RS1, the VLAN 100 of the quarantine network NW1 is combined with other VLANs 110 and 120 (not shown) to constitute a VPN#1 (virtual private network). Similarly the VLAN 200 of the business network NW2 is combined with other VLANs 210 and 220 (not shown) to constitute a VPN#2.

As shown in FIG. 1, the packet relay device RS1 has a VPN#1 processor 101, a VPN#2 processor 201, and an authentication daemon 301. The VPN#1 processor 101 takes charge of routing and forwarding of packets communicated in the VPN#1 corresponding to the quarantine network NW1 and allocates an IP address to each terminal belonging to the VPN#1. The VPN#2 processor 201 takes charge of routing and forwarding of packets communicated in the VPN#2 corresponding to the business network NW2 and allocates an IP address to each terminal belonging to the VPN#2. The authentication daemon 301 makes an inquiry about the authentication request from the terminal PC1 to the authentication server SV1 and receives an instruction responding to the inquiry from the authentication server SV1 to determine the affiliation of the terminal PC1 either to the VLAN 100 corresponding to the quarantine network NW1 or to the VLAN 200 corresponding to the business network NW2.

The VPN#1 processor 101 includes a routing module 111 that performs routing of packet communicated in the VPN#1, and a DHCP (dynamic host configuration protocol) server 121 that allocates an IP address to each terminal belonging to the VPN#1. The routing module 111 includes a routing table 112 having registry of pathway information in the VPN#1. The DHCP server module 121 includes a DHCP table 122 having registry of allocation of the IP address to the terminal.

The VPN#2 processor 201 includes a routing module 211 that performs routing of packet communicated in the VPN#2, and a DHCP server module 221 that allocates an IP address to each terminal belonging to the VPN#2. The routing module 211 includes a routing table 212 having registry of pathway information in the VPN#2. The DHCP server module 221 includes a DHCP table 222 having registry of allocation of the IP address to the terminal.

The system of the embodiment adopts the VRF (virtual routing and forwarding) technique and allows the packet relay device RS1 to have multiple independent routine policies. The packet relay device RS1 separately has the routing table 112 for the VPN#1 and the routing table 212 for the VPN#2 and activates the routing modules 111 and 211 to separately and independently implement the routing of the VPN#1 and the routing of the VPN#2. This allows the overlap of an identical IP address in the VPN#1 and the VPN#2.

FIG. 2 shows an example of registries in the routing tables 112 and 212 provided for the respective VPNs included in the terminal affiliation switchover system of FIG. 1. FIG. 2(*a*) shows the registry in the routing table 112 provided for the VPN#1 and included in the routing module 111. FIG. 2(*b*) shows the registry in the routing table 212 provided for the VPN#2 and included in the routing module 211.

As shown in FIG. 2(*a*), the routing table 112 for the VPN#1 has registry of an IP interface (IP I/F) set in the VPN#1. Each entry T1Rn (n=1 to 3) of the IP interface is correlated to a VLAN number, an IP address, and a subnet mask.

The IP interface represents the correlation between the IP address and the VLAN and indicates a subnet for affiliation of each terminal. For example, in the entry T1R1, the VLAN 100 has an IP address '10.0.0.1' allocated by the packet relay device RS1. Namely an IP address in a range of '10.0.0.2' to '10.0.0.254' is assigned to each terminal in the VLAN 100. In the entry T1R2, the VLAN 110 has an IP address '11.0.0.1' allocated by the packet relay device RS1. Namely an IP address in a range of '11.0.0.2' to '11.0.0.254' is assigned to each terminal in the VLAN 110. In the entry T1R3, the VLAN 120 has an IP address '12.0.0.1' allocated by the packet relay device RS1. Namely an IP address in a range of '12.0.0.2' to '12.0.0.254' is assigned to each terminal in the VLAN 120.

As shown in FIG. 2(*b*), the routing table 212 for the VPN#2 has registry of an IP interface (IP I/F) set in the VPN#2. Each entry T2Rn (n=1 to 3) of the IP interface is correlated to a VLAN number, an IP address, and a subnet mask.

As mentioned previously, the system of the embodiment adopts the VRF technique and allows the overlap of the same IP addresses in the VPN#1 and the VPN#2. The IP addresses and the subnet mask of the respective entries T2Rn (n=1 to 3) in the routing table 212 for the VPN#2 shown in FIG. 2(*b*) overlap the IP addresses and the subnet mask of the respective entries T1Rn (n=1 to 3) in the routing table 112 for the VPN#1 shown in FIG. 2(*a*).

Since the VPN#1 and the VPN#2 separately and independently perform the routing, the overlap of the same IP addresses and the same subnet mask in the VPN#1 and the VPN#2 is allowed.

For example, in response to reception of a packet from the terminal belonging to the VPN#1, the packet relay device RS1 activates the routing module 111 corresponding to the VPN#1. When the address written in the packet is in the IP address range of '10.0.0.2' to '10.0.0.254', the routing module 111 refers to the registry in the routing table 112 shown in FIG. 2(*a*) and relays the received packet to the VLAN 100. When the address written in the packet is in the IP address range of '11.0.0.2' to '11.0.0.254', the routing module 111 relays the received packet to the VLAN 110. When the address written in the packet is in the IP address range of '12.0.0.2' to '12.0.0.254', the routing module 111 relays the received packet to the VLAN 120. In response to reception of a packet from the terminal belonging to the VPN#2, the packet relay device RS1 activates the routing module 211 corresponding to the VPN#2. When the address written in the packet is in the IP address range of '10.0.0.2' to '10.0.0.254', the routing module 111 refers to the registry in the routing table 212 shown in FIG. 2(*b*) and relays the received packet to the VLAN 200. When the address written in the packet is in the IP address range of '11.0.0.2' to '11.0.0.254', the routing module 111 relays the received packet to the VLAN 210. When the address written in the packet is in the IP address range of '12.0.0.2' to '12.0.0.254', the routing module 111 relays the received packet to the VLAN 220.

In the system of the embodiment, the DHCP server module 121 included in the VPN#1 processor 101 and the DHCP server module 221 included in the VPN#2 processor 201 continuously synchronize the registry information in the DHCP table 122 with the registry information in the DHCP table 222. In the event of a switchover of affiliation of the terminal PC1 from the VLAN 100 corresponding to the quarantine network NW1 to the VLAN 200 corresponding to the business network NW2, such synchronization enables the terminal PC1 to continue communication without changing the IP address.

FIG. 3 shows an example of registries in the DHCP tables 122 and 222 provided for the respective VPNs included in the terminal affiliation switchover system of FIG. 1. FIG. 3(*a*) shows the registry in the DHCP table 122 provided for the VPN#1 and included in the DHCP server module 121. FIG.

3(b) shows the registry in the DHCP table 222 provided for the VPN#2 and included in the DHCP server module 221.

As shown in FIG. 3(a), the DHCP table 122 for the VPN#1 has registry of information regarding the IP addresses pooled for the VPN#1. Each entry T1Dn (n=1 to 3) is correlated to an IP address, a MAC address of the terminal using the IP address, and the use status of the IP address.

For example, in the entry T1D1, an IP address '10.0,0.2' is allocated to a terminal having a MAC address 'XXXX:XXX:0001' and is currently 'in use' in the use status. In the entry T1D2, an IP address '10.0.0.3' has not yet been allocated to any terminal and is currently 'unused' in the use status.

As shown in FIG. 3(b), the DHCP table 222 for the VPN#2 has registry of information regarding the IP addresses pooled for the VPN#2. Each entry T2Dn (n=1 to 3) is correlated to an IP address, a MAC address of the terminal using the IP address, and the use status of the IP address.

As mentioned previously, in the system of the embodiment, the registry information in the DHCP table 122 for the VPN#1 is continuously synchronized with the registry information in the DHCP table 222 for the VPN#2. The IP addresses, the MAC addresses, an the use statuses of the respective entries T2Dn (n=1 to 3) in the DHCP table 222 for the VPN#2 shown in FIG. 3(b) accordingly match with the MAC addresses, an the use statuses of the respective entries T1Dn (n=1 to 3) in the DHCP table 122 for the VPN#1 shown in FIG. 3(a).

For example, in response to an IP address allocation request from a certain terminal in the VPN#1, the DHCP server module 121 refers to the registry in the DHCP table 122 for the VPN#1 and allocates an unused IP address to the certain server. The DHCP server module 121 then writes a MAC address of the certain terminal and changes the use status from 'unused' to 'in use' in the entry correlated to the IP address in the DHCP table 122 for the VPN#1. The DHCP server module 121 also writes the MAC address of the certain terminal and changes the use status from 'unused' to 'in use' in the entry correlated to the IP address in the DHCP table 222 for the VPN#2. In the case of allocation of an IP address to one terminal in the VPN#1, the DHCP server module 121 changes the registry information in the DHCP table 122 for the VPN#1 and also makes the change of the registry information reflected in the registry of the DHCP table 222 for the VPN#2 via the DHCP server module 221.

In response to an IP address allocation request from a certain terminal in the VPN#2, the DHCP server module 221 allocates an unused IP address to the certain server and changes the registry information in the DHCP table 222 for the VPN#2. The DHCP server module 221 also makes the change of the registry information reflected in the registry of the DHCP table 122 for the VPN#1 via the DHCP server module 121.

When an object IP address previously in use is currently unused, the DHCP server modules 121 and 221 respectively confirm the absence of any terminal using the object IP address on the corresponding networks VPN#1 and VPN#2 and change the use status of the object IP address from 'in use' to 'unused' in the registries of the respective DHCP tables 122 and 222.

The authentication daemon 301 in the system of the embodiment is equivalent to the terminal affiliation switchover module in the claims of the invention. The DHCP server modules 121 and 221 of the embodiment correspond to the first DHCP server module and the second DHCP server module of the invention. The DHCP tables 122 and 222 of the embodiment are equivalent to the first DHCP table and the second DHCP table of the invention.

Figure 4:
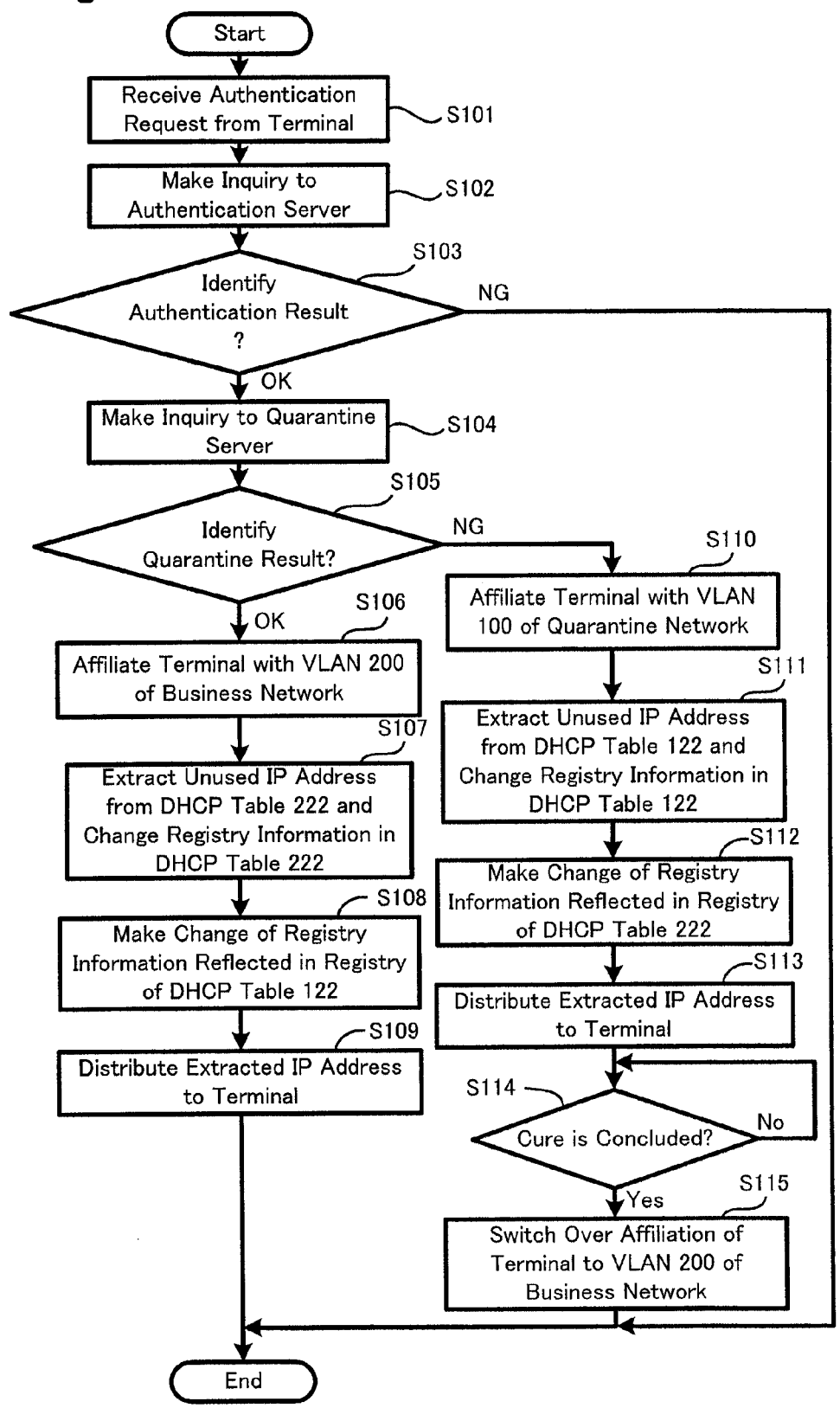
FIG. 4 is a flowchart showing a series of processing executed by a packet relay device RS1 included in the terminal affiliation switchover system of FIG. 1.

FIG. 4 is a flowchart showing a series of processing executed by the packet relay device RS1 included in the terminal affiliation switchover system of FIG. 1. The processing flow distributes an IP address to a terminal in the course of authentication and quarantine. The system of the embodiment adopts IEEE802.1x authentication, which is made by layer 2 level communication. The terminal PC1 can thus make authentication with the user name and the password in the absence of an IP address.

In the flowchart of FIG. 4, the authentication daemon 301 in the packet relay device RS1 receives an authentication request, together with the authentication information including the user name and the password, from the terminal PC1 (step S101). The authentication daemon 301 sends the received authentication information to the authentication server SV1 and makes an inquiry about whether the terminal PC1 is authenticated to the authentication server SV1 (step S102). The authentication server SV1 then determines whether the received authentication information matches with the information registered in the authentication database.

The authentication daemon 301 identifies an authentication result received from the authentication server SV1 (step S103). When the authentication result represents failed authentication, the authentication daemon 301 terminates the processing flow. When the authentication result represents successful authentication, on the other hand, the authentication daemon 301 makes an inquiry about whether the terminal PC1 satisfies the security policy to the quarantine server SV2 (step S104). The quarantine server SV2 then determines whether the terminal PC1 satisfies the security policy of the network.

The authentication daemon 301 identifies a quarantine result received from the quarantine server SV2 (step S105). When the quarantine result shows that the terminal PC1 satisfies the security policy of the network, the authentication daemon 301 affiliates the terminal PC1 with the VLAN 200 of the business network NW2 (step S106).

The DHCP server module 221 for the VPN#2 then extracts an unused IP address from the DHCP table 222 to be allocated to the terminal PC1 and changes the registry information regarding the extracted IP address in the DHCP table 222 (step S107). The DHCP server module 221 also makes the change of the registry information reflected in the registry of the DHCP table 122 for the VPN#1 via the DHCP server module 121 (step S108). The DHCP server module 221 then distributes the extracted IP address to the terminal PC1 (step S109).

When the quarantine result shows that the terminal PC1 does not satisfy but violates the security policy of the network, on the other hand, the authentication daemon 301 affiliates the terminal PC1 with the VLAN 100 of the quarantine network NW1 (step S110).

The DHCP server module 121 for the VPN#1 then extracts an unused IP address from the DHCP table 122 to be allocated to the terminal PC1 and changes the registry information regarding the extracted IP address in the DHCP table 122 (step S111). The DHCP server module 121 also makes the change of the registry information reflected in the registry of the DHCP table 222 for the VPN#2 via the DHCP server module 221 (step S112). The DHCP server module 121 then distributes the extracted IP address to the terminal PC1 (step S113).

The quarantine server SV2 provides a cure to make the terminal PC1 satisfy the security policy and notifies the packet relay device RS1 of conclusion of the cure via the authentication server SV1 (step S114). In response to this notification, the authentication daemon 301 switches over the affiliation of the terminal PC1 from the VLAN 100 of the quarantine network NW1 to the VLAN 200 of the business network NW2 (step S115).

The terminal PC1 can accordingly make communication with the business server SV3 without changing the IP address in the event of a switchover of the affiliated VLAN of the terminal PC1.

As described above, in the authentication quarantine network system of the first embodiment, the registry information in the DHCP table 122 for the VPN#1 is continuously synchronized with the registry information in the DHCP table 222 for the VPN#2. In the event of a switchover of the affiliated VLAN of the terminal PC1, the terminal PC1 can continue communication without changing the IP address.

B. Second Embodiment

Figure 5:
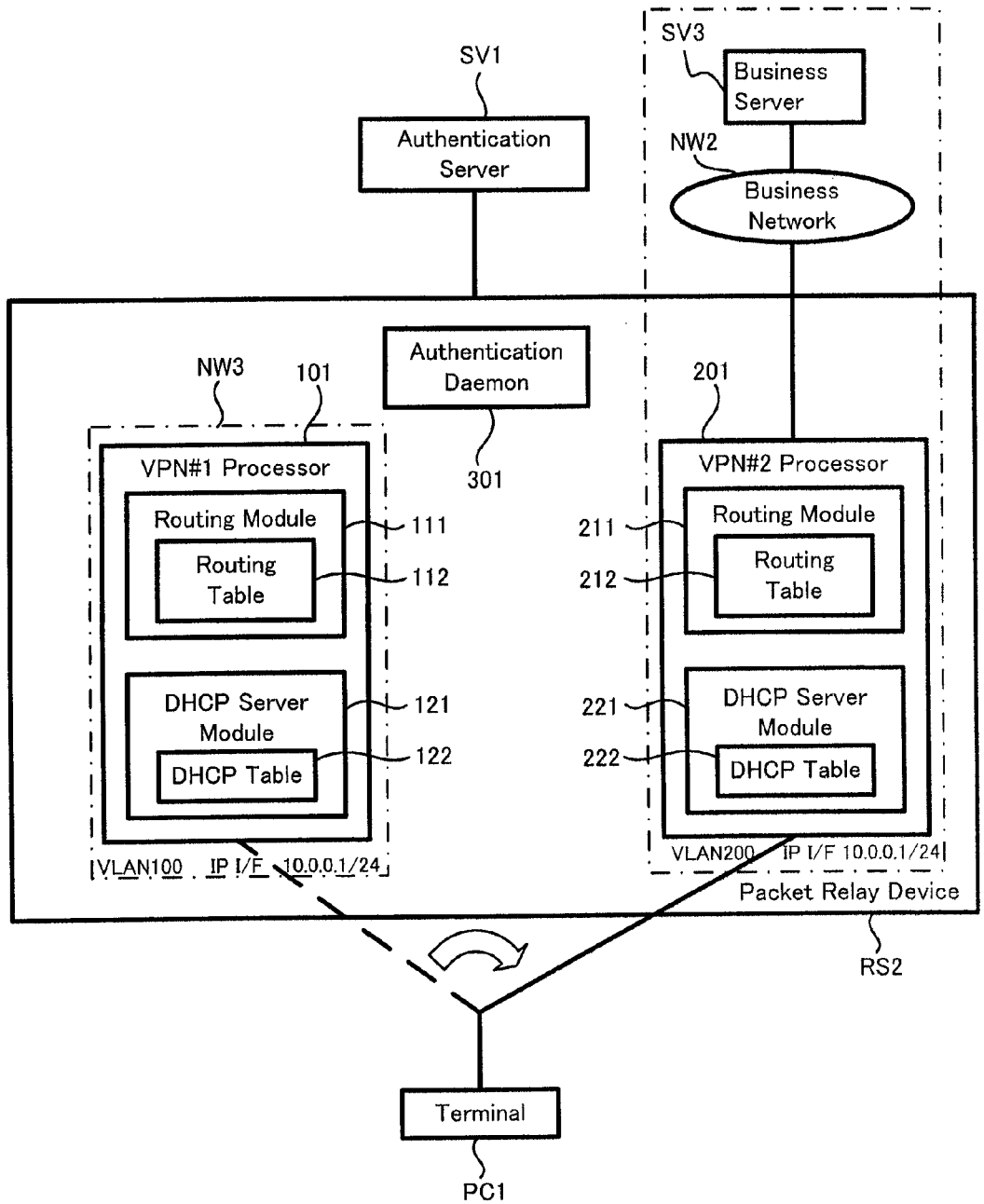
FIG. 5 is a block diagram schematically illustrating the configuration of a terminal affiliation switchover system in a second embodiment of the invention.

FIG. 5 is a block diagram schematically illustrating the configuration of a terminal affiliation switchover system in a second embodiment of the invention. The terminal affiliation switchover system of the second embodiment is adopted in an authentication network system.

As shown in FIG. 5, the terminal affiliation switchover system of the embodiment includes a packet relay device RS2 to relay packets in the authentication network system, a terminal PC1 connected to the packet relay device RS2 via the network, and a pre-authentication network NW3 and a business network (post-authentication network) NW2 as network constituents of the authentication network system.

The packet relay device RS2 is connected with an authentication server SV1, whereas the business network NW2 is connected with a business server SV3 like the system of the first embodiment. The pre-authentication network NW3 is used to isolate any terminal prior to authentication. The business network NW2 is used to allow an authenticated terminal to make access to the business server SV3 for operation. As in the system of the first embodiment, the pre-authentication network NW3 and the business network NW2 in the system of the second embodiment are constructed as separate networks that can not establish mutual communication. More specifically, the pre-authentication network NW3 and the business network NW2 respectively have a VLAN 100 and another VLAN 200 assigned thereto by the packet relay device RS2 to logically separate their communication. The pre-authentication network NW3 is designed to include only a VPN# 1 processor 101 in the packet relay device RS2. This arrangement desirably prevents the terminal prior to authentication from making communication with outside of the packet relay device RS2.

The authentication server SV1 and the business server SV3 in the system of the second embodiment are identical with those in the system of the first embodiment and are thus not specifically described here.

The packet relay device RS2 first allows the connection of the terminal PC1 to only the VLAN 100 of the pre-authentication network NW3, and, in response to authentication of the terminal PC1, allows the connection of the terminal PC1 to only the VLAN 200 of the business network NW2.

Like the system of the first embodiment, in the system of the second embodiment, by the function of the packet relay device RS2, the VLAN 100 of the pre-authentication network NW3 is combined with other VLANs 110 and 120 (not shown) to constitute a VPN#1. Similarly the VLAN 200 of the business network NW2 is combined with other VLANs 210 and 220 (not shown) to constitute a VPN#2.

The structure of the packet relay device RS2 included in the system of the second embodiment is identical with the structure of the packet relay device RS1 in the system of the first embodiment and is thus not specifically described here.

Figure 6:
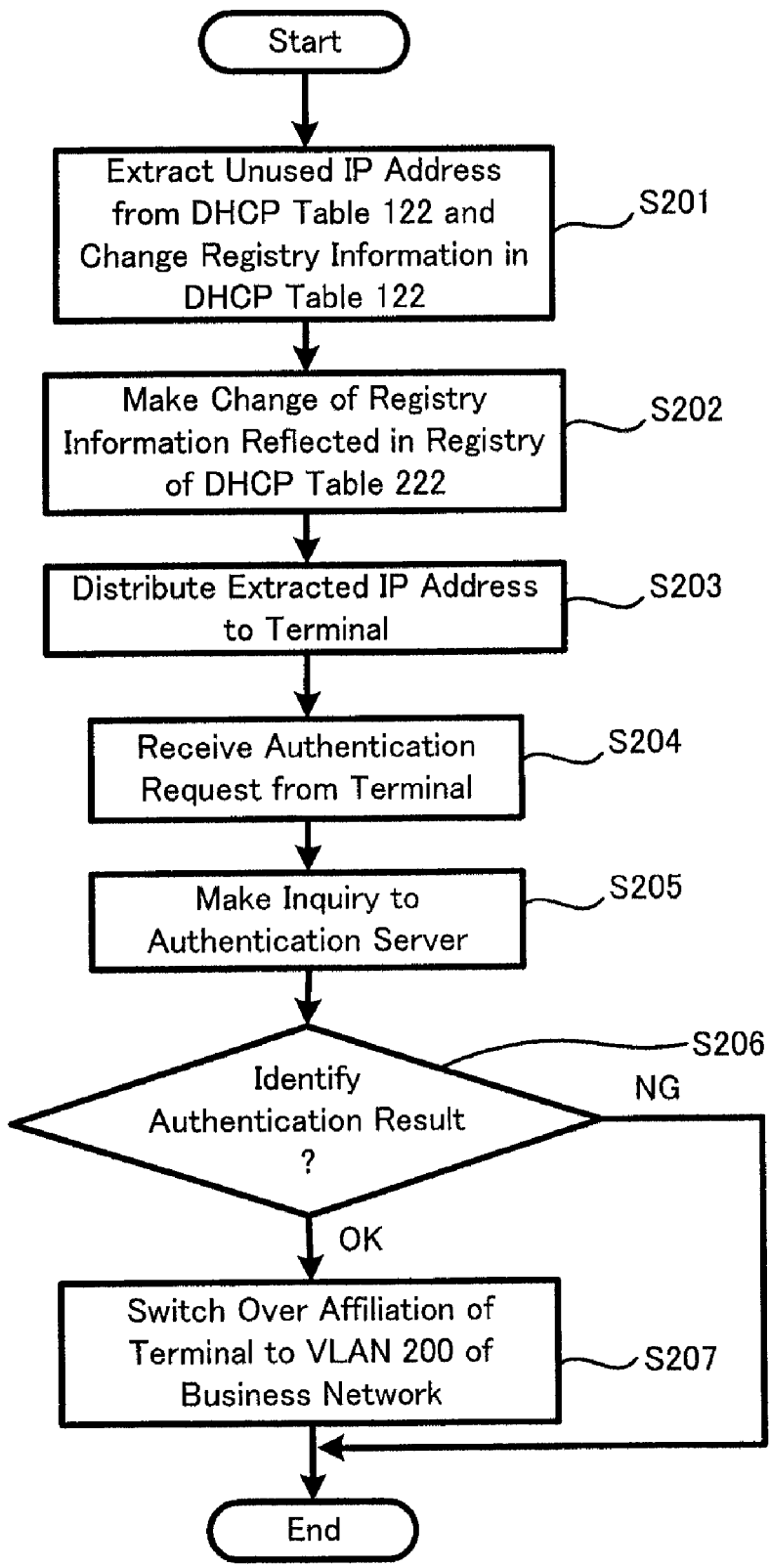
FIG. 6 is a flowchart showing a series of processing executed by a packet relay device RS2 included in the terminal affiliation switchover system of FIG. 5.

FIG. 6 is a flowchart showing a series of processing executed by the packet relay device RS2 included in the terminal affiliation switchover system of FIG. 5. The processing flow distributes an IP address to a terminal in the course of authentication. The system of the embodiment adopts Web authentication, which is made by layer 3 level communication. The terminal PC1 thus requires the IP address from the initial stage of the processing.

In the flowchart of FIG. 6, the DHCP server module 121 for the VPN#1 in the packet relay device RS2 first extracts an unused IP address from the DHCP table 122 to be allocated to the terminal PC1 and changes the registry information regarding the extracted IP address in the DHCP table 122 (step S201). The DHCP server module 121 also makes the change of the registry information reflected in the registry of the DHCP table 222 for the VPN#2 via the DHCP server module 221 (step S202). The DHCP server module 121 then distributes the extracted IP address to the terminal PC1 (step S203).

The authentication daemon 301 receives an authentication request, together with the authentication information including the user name and the password, from the terminal PC1 (step S204). The authentication daemon 301 sends the received authentication information to the authentication server SV1 and makes an inquiry about whether the terminal PC1 is authenticated to the authentication server SV1 (step S205). The authentication server SV1 then determines whether the received authentication information matches with the information registered in the authentication database.

The authentication daemon 301 identifies an authentication result received from the authentication server SV1 (step S206). When the authentication result represents failed authentication, the authentication daemon 301 terminates the processing flow. When the authentication result represents successful authentication, on the other hand, the authentication daemon 301 switches over the affiliation of the terminal PC1 from the VLAN 100 of the pre-authentication network NW3 to the VLAN 200 of the business network NW2 (step S207).

The terminal PC1 can accordingly make communication with the business server SV3 without changing the IP address in the event of a switchover of the affiliated VLAN of the terminal PC1.

As described above, as in the authentication quarantine network system of the first embodiment, in the authentication network system of the second embodiment, in the event of a switchover of the affiliated VLAN of the terminal PC1, the terminal PC1 can continue communication without changing the IP address.

C. Third Embodiment

Figure 7:
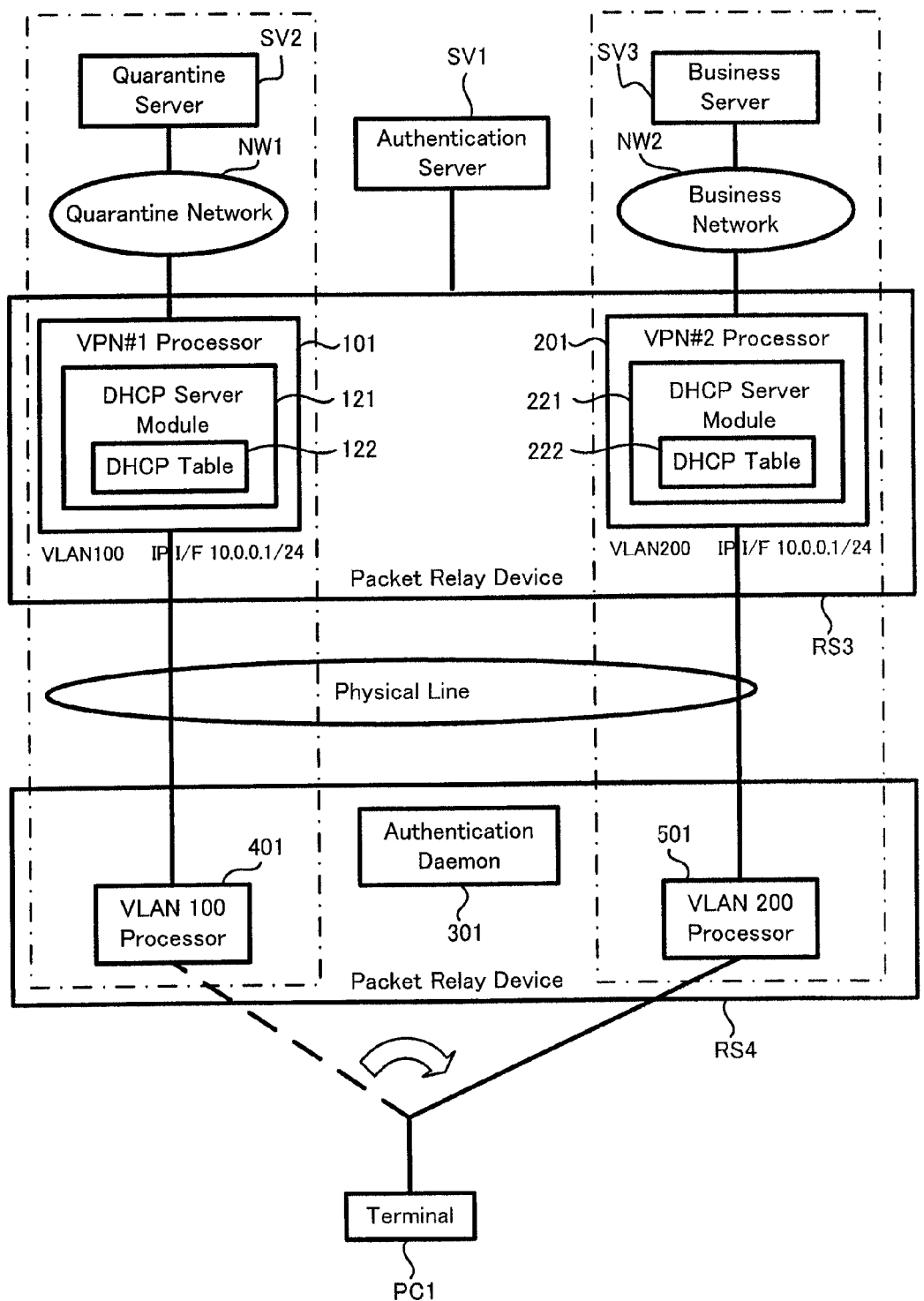
FIG. 7 is a block diagram schematically illustrating the configuration of a terminal affiliation switchover system in a third embodiment of the invention.

FIG. 7 is a block diagram schematically illustrating the configuration of a terminal affiliation switchover system in a third embodiment of the invention. The terminal affiliation switchover system of the third embodiment is adopted in an authentication quarantine network system.

The difference from the first embodiment is that the integral packet relay device RS1 of the first embodiment is replaced by two separate packet relay devices, that is, a packet relay device RS3 including DHCP servers 121 and 221 and a packet relay device RS4 including an authentication daemon

301. These two packet relay devices RS3 and RS4 are connected to each other via a physical line.

As shown in FIG. 7, the packet relay device RS3 includes a VPN#1 processor 101 and a VPN#2 processor 201. The structures of the VPN#1 processor 101 and the VPN#2 processor 201 in the system of the third embodiment are identical with those in the system of the first embodiment and are thus not specifically described here. The packet relay device RS3 also includes a routing module 111 and a routing module 211, which are omitted from the illustration for the simplicity of the drawing. The packet relay device RS3 is connected with an authentication server SV1.

The packet relay device RS4 includes a VLAN 100 processor 401 for management of the VLAN 100 and a VLAN 200 processor 501 for management of the VLAN 200, in addition to the authentication daemon 301, as shown in FIG. 7.

The packet relay device RS3 is constructed by a layer 3 switch, and the packet relay device RS4 is constructed by a layer 2 switch. The packet relay device RS4 accordingly does not require an IP address. A VLAN tag representing either the VLAN 100 or the VLAN 200 is attached to a header of each packet output from the packet relay device RS4. The packet relay device RS3 refers to the VLAN tag in the head of a packet and identifies the packet for the VLAN 100 or for the VLAN 200.

Otherwise the structure of the third embodiment is similar to the structure of the first embodiment and is thus not described in detail.

In the system of the third embodiment, the authentication daemon 301 of the packet relay device RS4 receives an authentication request, together with the authentication information including the user name and the password, from the terminal PC1. The authentication daemon 301 sends the received authentication information to the authentication server SV1 and makes an inquiry about whether the terminal PC1 is authenticated to the authentication server SV1. The authentication server SV1 then determines whether the received authentication information matches with the information registered in the authentication database.

The authentication daemon 301 identifies an authentication result received from the authentication server SV1. When the authentication result represents successful authentication, the authentication daemon 301 makes an inquiry about whether the terminal PC1 satisfies the security policy to the quarantine server SV2. The quarantine server SV2 then determines whether the terminal PC1 satisfies the security policy of the network.

The authentication daemon 301 identifies a quarantine result received from the quarantine server SV2. When the quarantine result shows that the terminal PC1 does not satisfy but violates the security policy of the network, the authentication daemon 301 affiliates the terminal PC1 with the VLAN 100 of the quarantine network NW1.

The DHCP server module 121 for the VPN#1 in the packet relay device RS3 extracts an unused IP address from the DHCP table 122 to be allocated to the terminal PC1 and changes the registry information regarding the extracted IP address in the DHCP table 122. The DHCP server module 121 also makes the change of the registry information reflected in the registry of the DHCP table 222 for the VPN#2 via the DHCP server module 221. The DHCP server module 121 then distributes the extracted IP address to the terminal PC1.

The quarantine server SV2 provides a cure to make the terminal PC1 satisfy the security policy and notifies the packet relay device RS4 of conclusion of the cure via the authentication server SV1. In response to this notification, the authentication daemon 301 in the packet relay device RS4 switches over the affiliation of the terminal PC1 from the VLAN 100 of the quarantine network NW1 to the VLAN 200 of the business network NW2.

The terminal PC1 can accordingly make communication with the business server SV3 without changing the IP address in the event of a switchover of the affiliated VLAN of the terminal PC1.

As described above, the authentication quarantine network system of the third embodiment uses the two separate packet relay devices, that is, the packet relay device RS3 including the DHCP servers 121 and 221 and the packet relay device RS4 including the authentication daemon 301, instead of the integral packet relay device RS1, and exerts the same effects as those in the authentication quarantine network system of the first embodiment.

D. Fourth Embodiment

Figure 8:
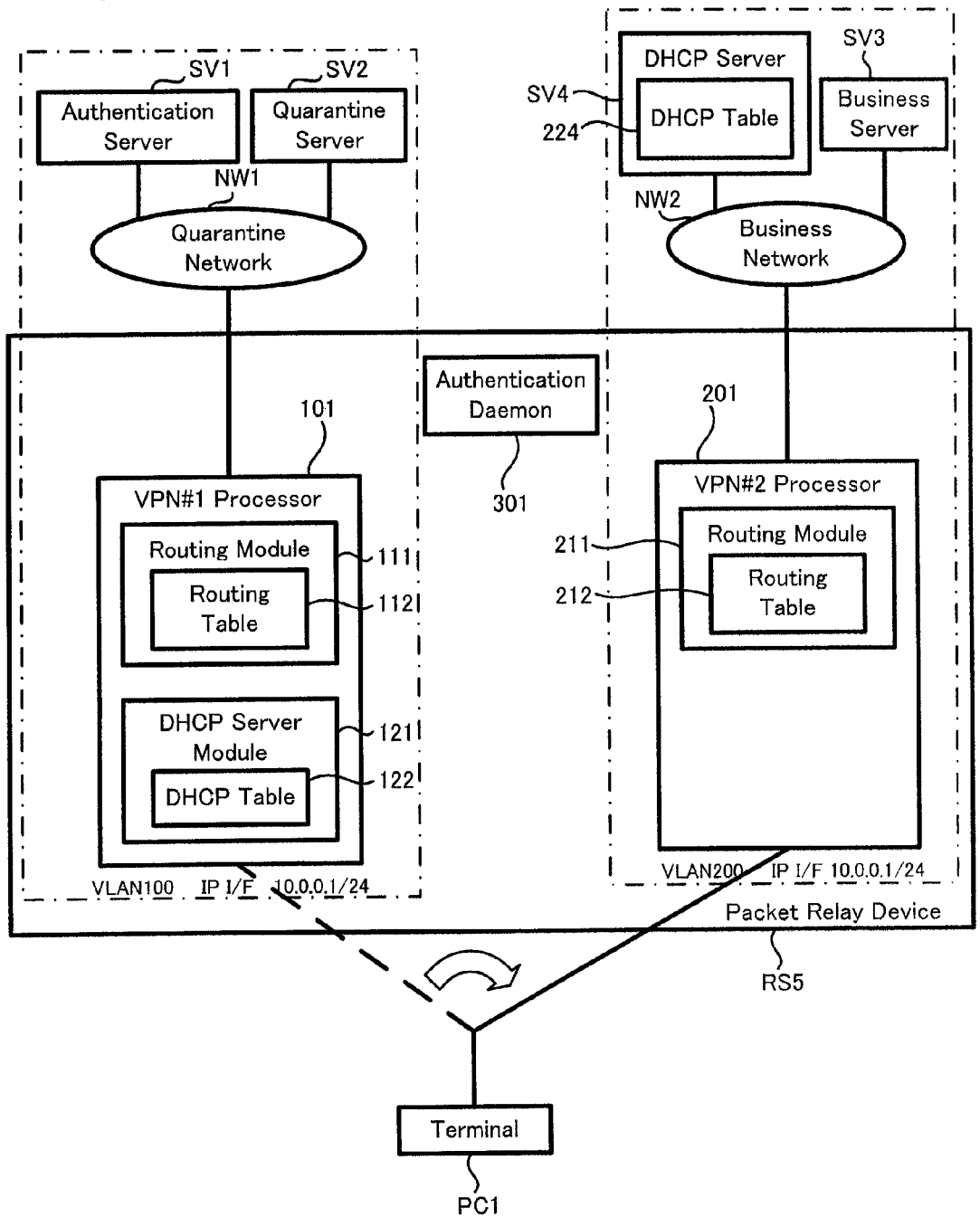
FIG. 8 is a block diagram schematically illustrating the configuration of a terminal affiliation switchover system in a fourth embodiment of the invention.

FIG. 8 is a block diagram schematically illustrating the configuration of a terminal affiliation switchover system in a fourth embodiment of the invention. The terminal affiliation switchover system of the fourth embodiment is adopted in an authentication quarantine network system.

The difference from the first embodiment is that a packet relay device RS5 has only one DHCP server module 121 for the VPN#1 and that a DHCP server for the VPN#2 is provided outside the packet relay device RS5.

As shown in FIG. 8, the packet relay device RS5 has a VPN#2 processor 201 with omission of the DHCP server module 221. The business network NW2 is connected with a DHCP server SV4 that allocates an IP address to each terminal belonging to the VPN#2. The DHCP server SV4 is constructed as a separate device and includes a DHCP table 224 having registry of allocation of the IP address to the terminal. The DHCP server SV4 makes communication with the DHCP server module 121 of the packet relay device RS5 to synchronize the registry information in the DHCP table 224 with the registry information in the DHCP table 122.

Otherwise the structure of the fourth embodiment is similar to the structure of the first embodiment and is thus not described in detail.

In the system of the fourth embodiment, the authentication daemon 301 of the packet relay device RS5 receives an authentication request, together with the authentication information including the user name and the password, from the terminal PC1. The authentication daemon 301 sends the received authentication information to the authentication server SV1 and makes an inquiry about whether the terminal PC1 is authenticated to the authentication server SV1. The authentication server SV1 then determines whether the received authentication information matches with the information registered in the authentication database.

The authentication daemon 301 identifies an authentication result received from the authentication server SV1. When the authentication result represents successful authentication, the authentication daemon 301 makes an inquiry about whether the terminal PC1 satisfies the security policy to the quarantine server SV2. The quarantine server SV2 then determines whether the terminal PC1 satisfies the security policy of the network.

The authentication daemon 301 identifies a quarantine result received from the quarantine server SV2. When the quarantine result shows that the terminal PC1 does not satisfy but violates the security policy of the network, the authentication daemon 301 affiliates the terminal PC1 with the VLAN 100 of the quarantine network NW1.

The DHCP server module 121 for the VPN#1 in the packet relay device RS5 extracts an unused IP address from the DHCP table 122 to be allocated to the terminal PC1 and changes the registry information regarding the extracted IP address in the DHCP table 122. The DHCP server module 121 simultaneously makes the change of the registry information reflected in the registry of the DHCP table 224 for the VPN#2 via the DHCP server SV4. The DHCP server module 121 then distributes the extracted IP address to the terminal PC1.

The quarantine server SV2 provides a cure to make the terminal PC1 satisfy the security policy and notifies the packet relay device RS5 of conclusion of the cure via the authentication server SV1. In response to this notification, the authentication daemon 301 in the packet relay device RS5 switches over the affiliation of the terminal PC1 from the VLAN 100 of the quarantine network NW1 to the VLAN 200 of the business network NW2.

The terminal PC1 can accordingly make communication with the business server SV3 without changing the IP address in the event of a switchover of the affiliated VLAN of the terminal PC1.

As described above, in the system of the fourth embodiment, the DHCP server module 121 for the VPN#1 is located inside the packet relay device RS5, while the DHCP server SV4 for the VPN#2 is provided as a separate device outside the packet relay device RS5. The authentication quarantine network system of the fourth embodiment having this configuration exerts the same effects as those in the authentication quarantine network system of the first embodiment.

E. Fifth Embodiment

Figure 9:
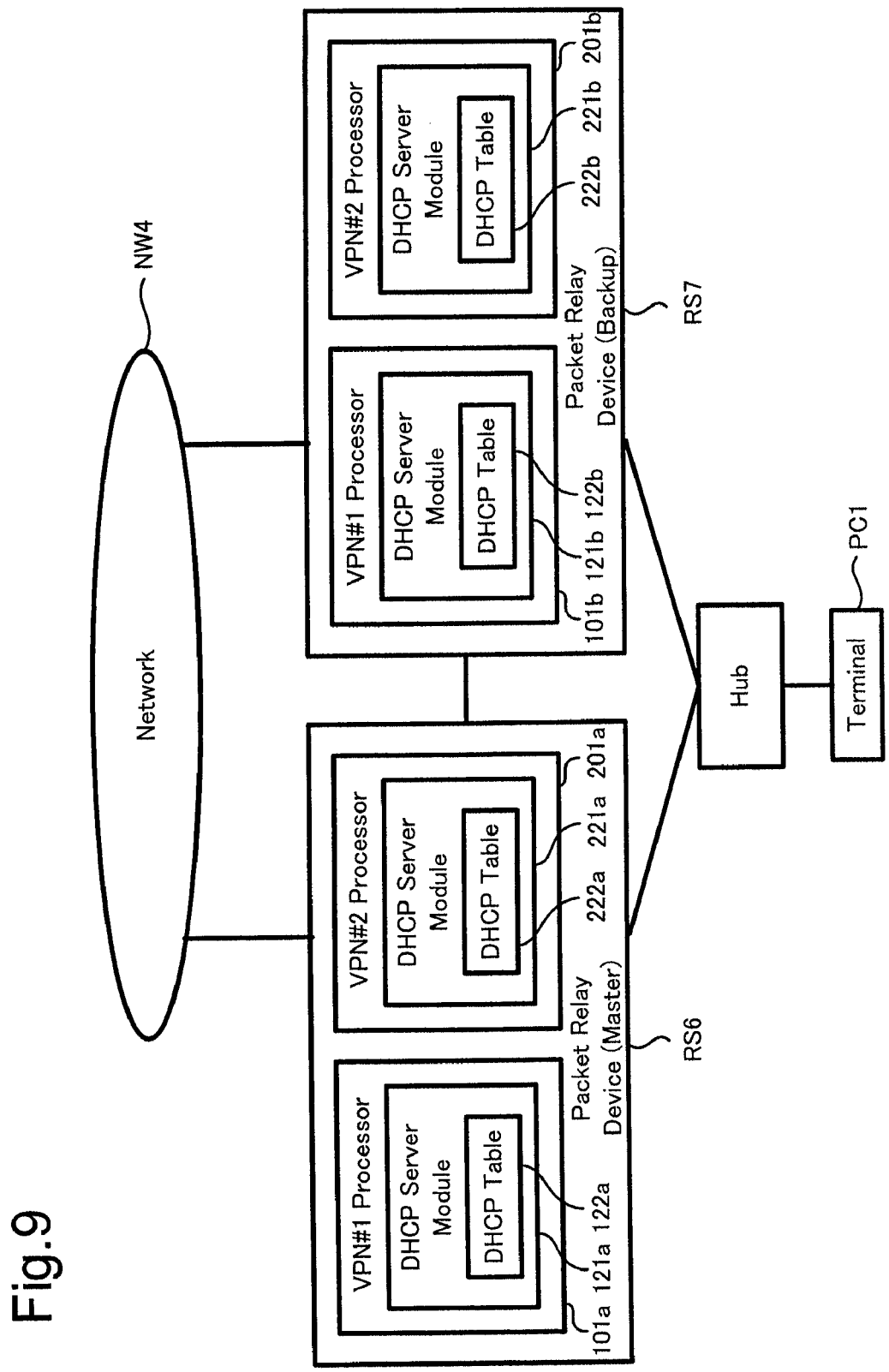
FIG. 9 is a block diagram schematically illustrating the configuration of a terminal affiliation switchover system in a fifth embodiment of the invention.
Figure 10:
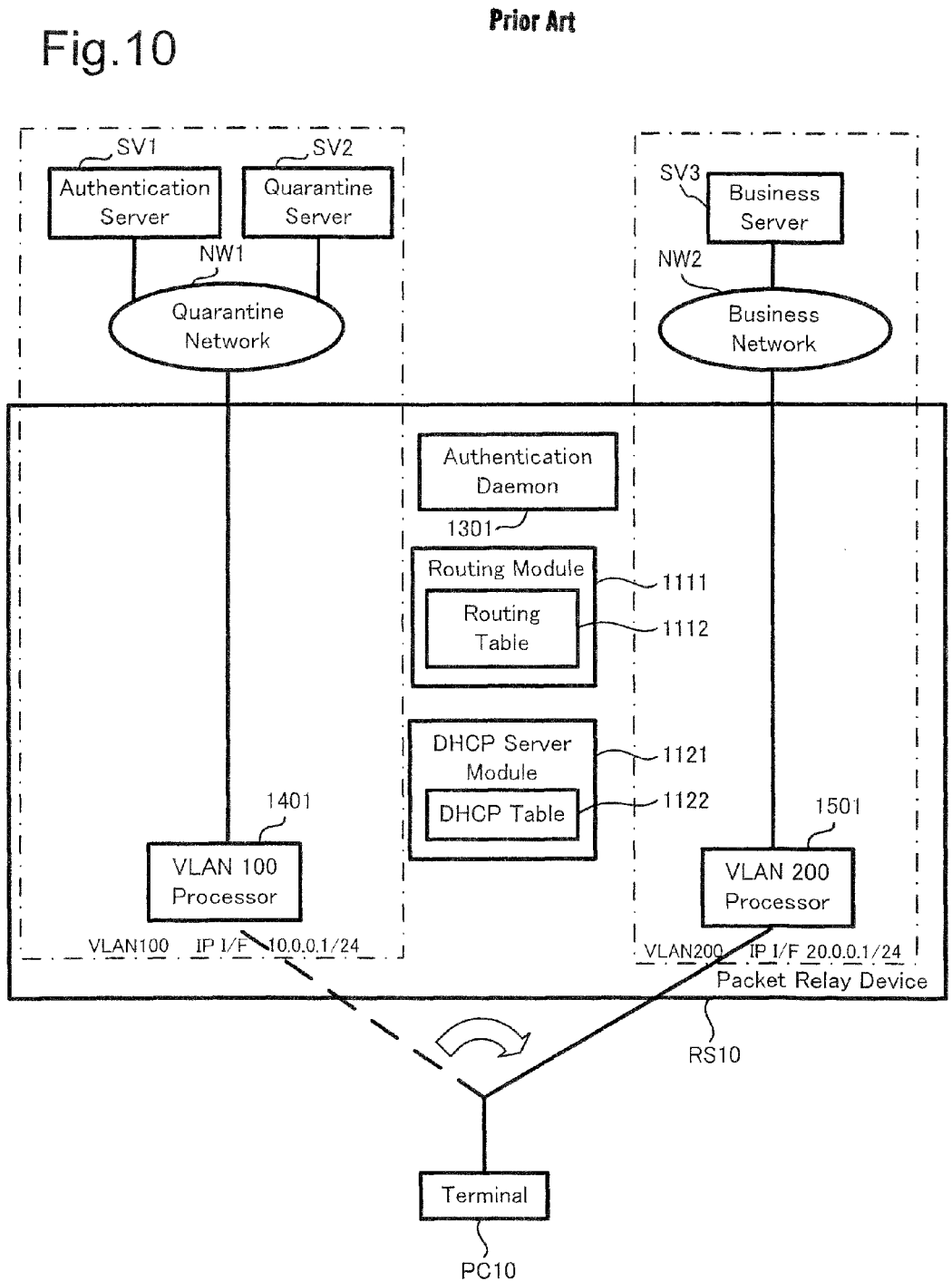
FIG. 10 is a block diagram schematically illustrating the configuration of a prior art terminal affiliation switchover system applied in an authentication quarantine network system.
Figure 11:
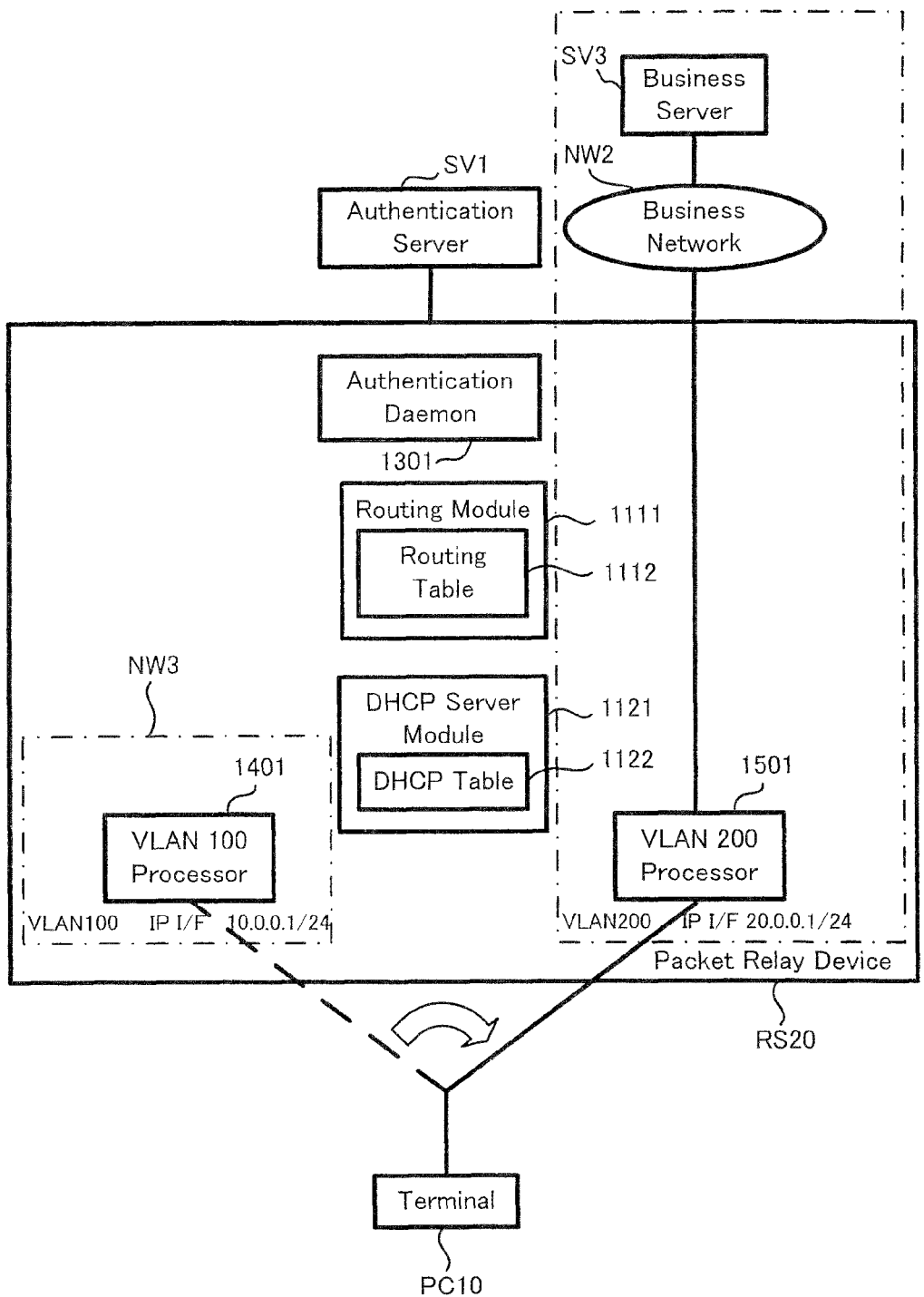
FIG. 11 is a block diagram schematically illustrating the configuration of a prior art terminal affiliation switchover system applied in an authentication network system.

FIG. 9 is a block diagram schematically illustrating the configuration of a terminal affiliation switchover system in a fifth embodiment of the invention.

The terminal affiliation switchover system of the fifth embodiment has two packet relay devices RS6 and RS7 based on the VRRP (virtual router redundancy protocol) for the redundancy of the network. In these two packet relay devices RS6 and RS7, for example, the packet relay device RS6 is set as a master and the packet relay device RS7 is set as a backup. The master packet relay device RS6 generally takes charge of communication. In the event of some failure or trouble occurring in the master packet relay device RS6, the backup packet relay device RS7 is appointed as a new master in place of the failed packet relay device RS6 and automatically takes over the communication. The two packet relay devices RS6 and RS7 exchange control signals at regular intervals to continuously monitor their statuses.

Like the packet relay device RS1 of the first embodiment, each of the two packet relay devices RS6 and RS7 has a VPN#1 processor 101a or 101b, a VPN#2 processor 201a or 201b, and an authentication daemon (not shown). The structures of the VPN#1 processors 101a and 101b and the VPN#2 processors 201a and 201b in the system of the fifth embodiment are identical with those of the VPN#1 processor 101 and the VPN#2 processor 201 in the system of the first embodiment and are thus not specifically described here. The VPN#1 and VPN#2 processors respectively have a routing module 111 and a routing module 211, which are omitted from the illustration for the simplicity of the drawing.

In the system of the fifth embodiment, the registry information in a DHCP table 122a for the VPN#1 in the master packet relay device RS6 is continuously synchronized with the registry information in a DHCP table 222a for the VPN#2 in the master packet relay device RS6, as well as with the registry information in a DHCP table 122b for the VPN#1 and the registry information in a DHCP table 222b for the VPN#2 in the backup packet relay device RS7.

In the case of allocation of an IP address to one terminal in the VPN#1, the DHCP server module 121a in the master packet relay device RS6 changes the registry information in the DHCP table 122a for the VPN#1 and also makes the change of the registry information reflected in the registry of the DHCP table 222a for the VPN#2 via the DHCP server module 221a. The DHCP server module 121a in the master packet relay device RS6 simultaneously makes the change of the registry information reflected in the registry of the DHCP table 122b for the VPN#1 via the DHCP server module 121b in the backup packet relay device RS7 and in the registry of the DHCP table 222b for the VPN#2 via the DHCP server module 221b in the backup packet relay device RS7.

As described above, in the system of the fifth embodiment, the registry information in the DHCP tables 122b and 222b in the backup packet relay device RS7 is continuously synchronized with the registry information in the DHCP tables 122a and 222a in the master packet relay device RS6. Even when the backup packet relay device RS7 is appointed as a new master and takes over communication in the event of some failure or trouble in the master packet relay device RS6, the terminal PC1 can continue the communication without changing the IP address regardless of a switchover of the affiliated VLAN of the terminal PC1.

F. Modifications

The embodiments discussed above are to be considered in all aspects as illustrative and not restrictive. There may be many modifications, changes, and alterations without departing from the scope or spirit of the main characteristics of the present invention.

In the terminal affiliation switchover systems of the above embodiments, one DHCP server module (or one DHCP server) is provided for each VPN. This structure is, however, not essential. As long as management of registry information is allowed in each DHCP table provided for each VPN, the system may include only one DHCP server module (or only one DHCP server) provided for all the VPNs, in place of multiple DHCP server modules (or multiple DHCP servers) provided for the respective VPNs.

What is claimed is:

1. A terminal affiliation switchover system that switches over affiliation of a terminal at least between a first network and a second network, the terminal affiliation switchover system comprising:

a terminal affiliation switchover module, implemented by a processor, configured to acquire authentication information from a user of the terminal and switch over the affiliation of the terminal between the first network and the second network;

an authentication server configured to authenticate the terminal based on the authentication information;

a quarantine server connected to the first network configured to allow the terminal to satisfy a predetermined security policy;

a first dynamic host configuration protocol (DHCP) server module connected to the first network, implemented by a processor, configured to allocate an Internet Protocol (IP) address to the terminal;

a second dynamic host configuration protocol (DHCP) server module connected to the second network, implemented by a processor, configured to allocate another Internet Protocol (IP) address to the terminal;

in response to successfully authenticating the terminal, the
terminal affiliation switchover module:
determines whether or not the terminal satisfies the predetermined security policy by making an inquiry to the quarantine server; and
in response to determining that the terminal does not satisfy the predetermined security policy, affiliating the terminal with the first network, wherein the quarantine server allows the terminal to satisfy the predetermined security policy;
wherein once the terminal satisfies the predetermined security policy, the terminal affiliation switchover module switches over the affiliation of the terminal to the second network connected with a business server;
wherein the first DHCP server module allocates a first IP address to the terminal based on registry information in a first DHCP table when the terminal is affiliated with the first network;
wherein the second DHCP server module allocates a second IP address to the terminal based on registry information in a second DHCP table when the terminal is affiliated with the second network;
wherein the first network and the second network are independent Virtual Private Networks (VPNs) or virtual private networks that are not mutually communicable and separately and independently perform routing and forwarding operations, and wherein allocatable ranges of IP addresses, which are allocated to the terminal by the first DHCP server module and the second DHCP server module, respectively overlap,
wherein at every time of any change of the registry information in one of the first DHCP table and the second DHCP table, the first DHCP server module and the second DHCP server module make the change of the registry information reflected in the registry information in the other of the first DHCP table and the second DHCP table, so that the first DHCP table and the second DHCP table have at least identical mapping information representing a correlation of the terminal to the IP address, and
wherein the terminal, the terminal affiliation switchover module, the quarantine server, the authentication server, and the business server are separate devices.

2. The terminal affiliation switchover system in accordance with claim 1, wherein the terminal affiliation switchover module, the first DHCP server module, and the second DHCP server module are incorporated in one identical device.

3. The terminal affiliation switchover system in accordance with claim 1, wherein the first DHCP server module and the second DHCP server module are incorporated in one identical device, and the terminal affiliation switchover module is provided separately in a different device other than the identical device.

4. The terminal affiliation switchover system in accordance with claim 3, wherein the first DHCP server module and the second DHCP server module are incorporated in one identical packet relay device.

5. The terminal affiliation switchover system in accordance with claim 1, wherein the first DHCP server module and the second DHCP server module are provided separately in different devices.

6. The terminal affiliation switchover system in accordance with claim 1, wherein the terminal uses the same IP address in the second network as the one used in the first network when the affiliation of the terminal is switched over from the first network to the second network by the terminal affiliation switchover module.

7. A terminal affiliation switchover system that switches over affiliation of a terminal at least between a first network and a second network, the terminal affiliation switchover system comprising:
a terminal affiliation switchover module, implemented by a processor, configured to acquire authentication information from a user of the terminal and switch over the affiliation of the terminal between the first network and the second network;
an authentication server configured to authenticate the terminal based on the authentication information;
a quarantine server connected to the first network configured to allow the terminal to satisfy a predetermined security policy;
a dynamic host configuration protocol (DHCP) server module, implemented by a processor, configured to allocate an Internet Protocol (IP) address to the terminal;
in response to successfully authenticating the terminal, the terminal affiliation switchover module:
determines whether or not the terminal satisfies the predetermined security policy by making an inquiry to the quarantine server; and
in response to determining that the terminal does not satisfy the predetermined security policy, affiliating the terminal with the first network, wherein the quarantine server allows the terminal to satisfy the predetermined security policy;
wherein once the terminal satisfies the predetermined security policy, the terminal affiliation switchover module switches over the affiliation of the terminal to the second network connected with a business server;
wherein the DHCP server module allocates a first IP address to the terminal based on registry information in a first DHCP table when the terminal is affiliated with the first network;
wherein the DHCP server module allocates a second IP address to the terminal based on registry information in a second DHCP table when the terminal is affiliated with the second network;
wherein the first network and the second network are independent Virtual Private Networks (VPNs) or virtual private networks that are not mutually communicable and separately and independently perform routing and forwarding operations, and wherein allocatable ranges of IP addresses, which are allocated to the terminal by the first DHCP server module and the second DHCP server module, respectively overlap,
wherein at every time of any change of the registry information in one of the first DHCP table and the second DHCP table, the first DHCP server module and the second DHCP server module make the change of the registry information reflected in the registry information in the other of the first DHCP table and the second DHCP table, so that the first DHCP table and the second DHCP table have at least identical mapping information representing a correlation of the terminal to the IP address, and
wherein the terminal, the terminal affiliation switchover module, the quarantine server,
the authentication server, and the business server are separate devices.

8. A terminal affiliation switchover system that switches over affiliation of a terminal at least between a first network and a second network, the terminal affiliation switchover system comprising:
a plurality of packet relay devices implementing a virtual router redundancy protocol (VRRP);

a first packet relay device of the plurality of packet relay devices configured to operate as a master and a second packet relay device of the plurality of packet relay devices configured to operate as a backup;

the first packet relay device of the plurality of packet relay devices configured to operate as a master further comprises:

a terminal affiliation switchover module, implemented by a processor, configured to acquire authentication information from a user of the terminal and switch over the affiliation of the terminal between the first network and the second network;

an authentication server configured to authenticate the terminal based on the authentication information;

a quarantine server connected to the first network configured to allow the terminal to satisfy a predetermined security policy;

a first dynamic host configuration protocol (DHCP) server module connected to the first network, implemented by a processor, configured to allocate an Internet Protocol (IP) address to the terminal;

a second dynamic host configuration protocol (DHCP) server module connected to the second network, implemented by a processor, configured to allocate another Internet Protocol (IP) address to the terminal;

in response to successfully authenticating the terminal, the terminal affiliation switchover module:

determines whether or not the terminal satisfies the predetermined security policy by making an inquiry to the quarantine server; and in response to determining that the terminal does not satisfy the predetermined security policy, affiliating the terminal with the first network, wherein the quarantine server allows the terminal to satisfy the predetermined security policy;

wherein once the terminal satisfies the predetermined security policy, the terminal affiliation switchover module switches over the affiliation of the terminal to the second network connected with a business server;

wherein the first DHCP server module allocates a first IP address to the terminal based on registry information in a first DHCP table when the terminal is affiliated with the first network;

wherein the second DHCP server module allocates a second IP address to the terminal based on registry information in a second DHCP table when the terminal is affiliated with the second network;

the second packet relay device of the plurality of packet relay devices configured to operate as a backup further comprises:

a second terminal affiliation switchover module, implemented by a processor, configured to acquire authentication information from the user of the terminal and switch over the affiliation of the terminal between the first network and the second network when the second packet relay device is appointed as a new master;

the authentication server configured to authenticate the terminal based on the authentication information acquired by the second terminal affiliation switchover module;

the quarantine server connected to the first network configured to allow the terminal to satisfy a predetermined security policy;

a third dynamic host configuration protocol (DHCP) server module connected to the first network, implemented by a processor, configured to allocate the Internet Protocol (IP) address to the terminal when the second packet relay device is appointed as a new master;

a fourth dynamic host configuration protocol (DHCP) server module connected to the second network, implemented by a processor, configured to allocate the another Internet Protocol (IP) address to the terminal when the second packet relay device is appointed as a new master;

in response to successfully authenticating the terminal, the second terminal affiliation switchover module:

determines whether or not the terminal satisfies the predetermined security policy by making an inquiry to the quarantine server when the second packet relay device is allocated as a new master; and in response to determining that the terminal does not satisfy the predetermined security policy, affiliating the terminal with the first network, wherein the quarantine server allows the terminal to satisfy the predetermined security policy;

wherein once the terminal satisfies the predetermined security policy, the second terminal affiliation switchover module switches over the affiliation of the terminal to the second network connected with a business server when the second packet relay device is appointed as a new master;

wherein the third DHCP server module allocates a third IP address to the terminal based on registry information in a third DHCP table when the terminal is affiliated with the first network when the second packet relay device is appointed as a new master;

wherein the fourth DHCP server module allocates a fourth IP address to the terminal based on registry information in a fourth DHCP table when the terminal is affiliated with the second network when the second packet relay device is appointed as a new master;

wherein the first network and the second network are independent Virtual Private Networks (VPNs) or virtual private networks that are not mutually communicable and separately and independently perform routing and forwarding operations, and wherein allocatable ranges of IP addresses, which are allocated to the terminal by the first DHCP server module and the second DHCP server module, respectively overlap, wherein at every time of any change of the registry information in one of the first DHCP table and the second DHCP table, the first DHCP server module and the second DHCP server module in the first packet relay device set as the master make the change of the registry information reflected in the registry information in the other of the first DHCP table and the second DHCP table and in the registry information in both the third DHCP table and the fourth DHCP table in the second packet relay device set as the backup, so that the first DHCP table and the second DHCP table in the first packet relay device and the third DHCP table and the fourth DHCP table in the second packet relay device have at least identical mapping information representing a correlation of the terminal to the IP address, and wherein the terminal, the terminal affiliation switchover module, the quarantine server, the authentication server, and the business server are separate devices.

* * * * *